US011321566B2

(12) United States Patent
Mathwig

(10) Patent No.: US 11,321,566 B2
(45) Date of Patent: May 3, 2022

(54) SYSTEMS AND METHODS FOR SELF-LEARNING A FLOORPLAN LAYOUT USING A CAMERA SYSTEM

(71) Applicant: JPMorgan Chase Bank, N.A., New York, NY (US)

(72) Inventor: Jeffrey Dean Mathwig, Worthington, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/001,011

(22) Filed: Aug. 24, 2020

(65) Prior Publication Data

US 2021/0056309 A1 Feb. 25, 2021

Related U.S. Application Data

(60) Provisional application No. 62/890,133, filed on Aug. 22, 2019.

(51) Int. Cl.
*G06K 9/00* (2022.01)
*G06T 7/70* (2017.01)
*G06T 7/00* (2017.01)

(52) U.S. Cl.
CPC ...... *G06K 9/00671* (2013.01); *G06K 9/00711* (2013.01); *G06T 7/70* (2017.01); *G06T 7/97* (2017.01); *G06T 2207/10016* (2013.01)

(58) Field of Classification Search
None
See application file for complete search history.

(56) References Cited

U.S. PATENT DOCUMENTS

| | | | |
|---|---|---|---|
| 8,615,106 | B2 | 12/2013 | Wedge |
| 9,886,624 | B1 | 2/2018 | Marty |
| 9,911,053 | B2 | 3/2018 | Miyano |
| 10,311,459 | B1 | 6/2019 | Babao |
| 10,491,943 | B1 | 11/2019 | Wahlquist-Ortiz |
| 2007/0094721 | A1 | 4/2007 | Nguyen |
| 2008/0120328 | A1 | 5/2008 | Delgo |
| 2010/0093421 | A1 | 4/2010 | Nyman |
| 2012/0249831 | A1 | 10/2012 | Porter |

(Continued)

OTHER PUBLICATIONS

U.S. Appl. No. 15/999,146, filed Aug. 2017, Jeffrey Dean Mathwig.

*Primary Examiner* — Delomia L Gilliard
(74) *Attorney, Agent, or Firm* — Greenblum & Bernstein, P.L.C.

(57) ABSTRACT

An embodiment of the present invention is directed to a system and method for self-learning a floorplan layout. An embodiment of the present invention is directed to implementing a camera system in a location to learn, create and maintain changes to a current floor plan. The camera system may include multiple cameras positioned at strategic locations throughout a defined area. An embodiment of the present invention may determine direction and velocity of an individual's path of travel. Over a period of time, an embodiment of the present invention may systematically create, maintain and update the floor plan. The location may include various areas, including branch locations, banks, merchants, restaurants, office space, entrance way (e.g., lobby), common areas, defined area within a public space or an outdoor space, etc.

20 Claims, 2 Drawing Sheets

Receive Camera Image from a Plurality of Cameras
210

Identify Stationary Objects
212

Identify Individual Movement Across the Plurality of Cameras
214

Identify Velocity and Path of Individual
216

Using Individual Movement Relative to Stationary Objects, Generate Floor Plan Layout
218

Provide Feedback/Recommendations
220

(56) References Cited

U.S. PATENT DOCUMENTS

2013/0136350 A1 5/2013 Pai
2015/0205301 A1 7/2015 Gilmore
2015/0352450 A1 12/2015 Burrows
2015/0355311 A1 12/2015 O'Hagan
2016/0035094 A1* 2/2016 Kennedy .................. G06T 7/73 382/100
2016/0057565 A1 2/2016 Gold
2016/0101358 A1 4/2016 Ibrahim
2017/0161561 A1 6/2017 Marty
2017/0241787 A1* 8/2017 Trigoni ................ G01C 21/206
2018/0268220 A1* 9/2018 Lee .................... G06K 9/00979
2019/0057248 A1* 2/2019 Mathwig ................ G06F 16/51
2019/0180104 A1* 6/2019 Sheffield ................ G06N 20/00
2019/0213627 A1 7/2019 Rudnick
2019/0370994 A1* 12/2019 Norris ...................... G06T 7/73
2020/0020112 A1* 1/2020 Buibas ................ G06K 9/6271
2020/0225673 A1* 7/2020 Ebrahimi Afrouzi ........................ G05D 1/0214
2020/0226361 A1* 7/2020 Murray ............. G06K 9/00771

* cited by examiner

SYSTEMS AND METHODS FOR SELF-LEARNING A FLOORPLAN LAYOUT USING A CAMERA SYSTEM

CROSS REFERENCE TO RELATED APPLICATIONS

The application claims priority to U.S. Provisional Application 62/890,133, filed Aug. 22, 2019, the contents of which are incorporated herein in their entirety.

FIELD OF THE INVENTION

The present disclosure generally relates to systems and methods for automatically self-learning a floorplan layout using a camera system.

BACKGROUND OF THE INVENTION

When trying to determine path of travel for customers in a branch or other location, current systems require preloading a floor plan with precise furniture and branch equipment placement. This approach carries a large operational overhead. Current technology for stitching together different cameras is a manual and labor-intensive process. Because of camera placements, fields of view in relationship with other cameras likely leave gaps. This arrangement simply does not provide enough information for meaningful data analytics. Moreover, for an entity with hundreds or even thousands of branch locations, the effort can be substantial.

These and other drawbacks exist.

SUMMARY OF THE INVENTION

According to an embodiment, the invention relates to a method for self-learning a layout. The method comprises the steps of: in an information processing apparatus comprising at least one computer processor: receiving, from a first image capture device located at a facility, a first image; receiving, from a second image capture device located at the facility, a second image; identifying one or more stationary objects located at the facility; recognizing, in the first image and the second image, a mobile entity relative to the one or more stationary objects with a set of known attributes; determining vector data associated with the mobile entity based on the first image and the second image; and responsive to the vector data, automatically generating floor layout data identifying placement of the one or more stationary objects located at the facility.

According to another embodiment, the invention relates to a system for self-learning a layout. The system comprises: a first image capture device located at a facility; a second image device located at the facility; and an information processing apparatus comprising at least one computer processor, where the at least one computer processor is configured to perform the steps of: receiving, from the first image capture device located at the facility, a first image; receiving, from the second image capture device located at the facility, a second image; identifying one or more stationary objects located at the facility; recognizing, in the first image and the second image, a mobile entity relative to the one or more stationary objects with a set of known attributes; determining vector data associated with the mobile entity based on the first image and the second image; and responsive to the vector data, automatically generating floor layout data identifying placement of the one or more stationary objects located at the facility.

A method of an embodiment of the present invention may be conducted on a specially programmed computer system comprising one or more computer processors, mobile devices, electronic storage devices, and networks.

The computer implemented system, method and medium described herein can provide the advantages of improved floor plan generation and optimal arrangement. The various embodiments of the present invention may achieve benefits and advantages for branch managers, financial institutions, merchants, restaurants, service providers as well as other entities. An embodiment of the present invention accurately and systematically generates a floor plan based on individual interactions with the system. An interaction may involve a determination of velocity and direction data in relation to one or more stationary objects with known attributes. With an embodiment of the present invention, entities with a large presence may efficiently identify hundreds and even thousands of branch locations with minimal disruption. An embodiment of the present invention may provide data analytics and feedback for marketing placement, improved customer engagement and efficient use of space and placement.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF PREFERRED EMBODIMENTS

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to implementing a camera system in a location (e.g., branch location, store location, etc.) to learn, create and maintain changes to a current floor plan. The camera system may include multiple cameras positioned at strategic locations throughout a defined area. An embodiment of the present invention may use object recognition, along with an understanding of direction and velocity of an individual's path of travel. Over a period of time, an embodiment of the present invention may systematically create, maintain and update the floor plan. The location may include various areas, including branch locations, banks, merchants, restaurants, office space, entrance way (e.g., lobby), common areas, defined area within a public space or an outdoor space, etc.

With an embodiment of the present invention, a first camera may recognize an individual. With a certain time-frame, the same individual may enter a second camera view. The individual may be recognized as the same individual by common features (e.g., height, characteristics, personal belongings, etc.). An embodiment of the present invention may determine camera placement (e.g., height, angle, skew, position, etc.) based on the individual moving from a first camera view to a second camera view. By capturing an individual's vector data (e.g., velocity, distance, speed, etc.) between camera frames, an embodiment of the present invention may determine relative placement of objects in the relative areas. An embodiment of the present invention may further consider camera skew and scale based on camera angle, camera view, position, etc. An embodiment of the present invention may also consider traffic flow as well as expected path of travel (e.g., lanes, aisles, etc.).

Figure 1:
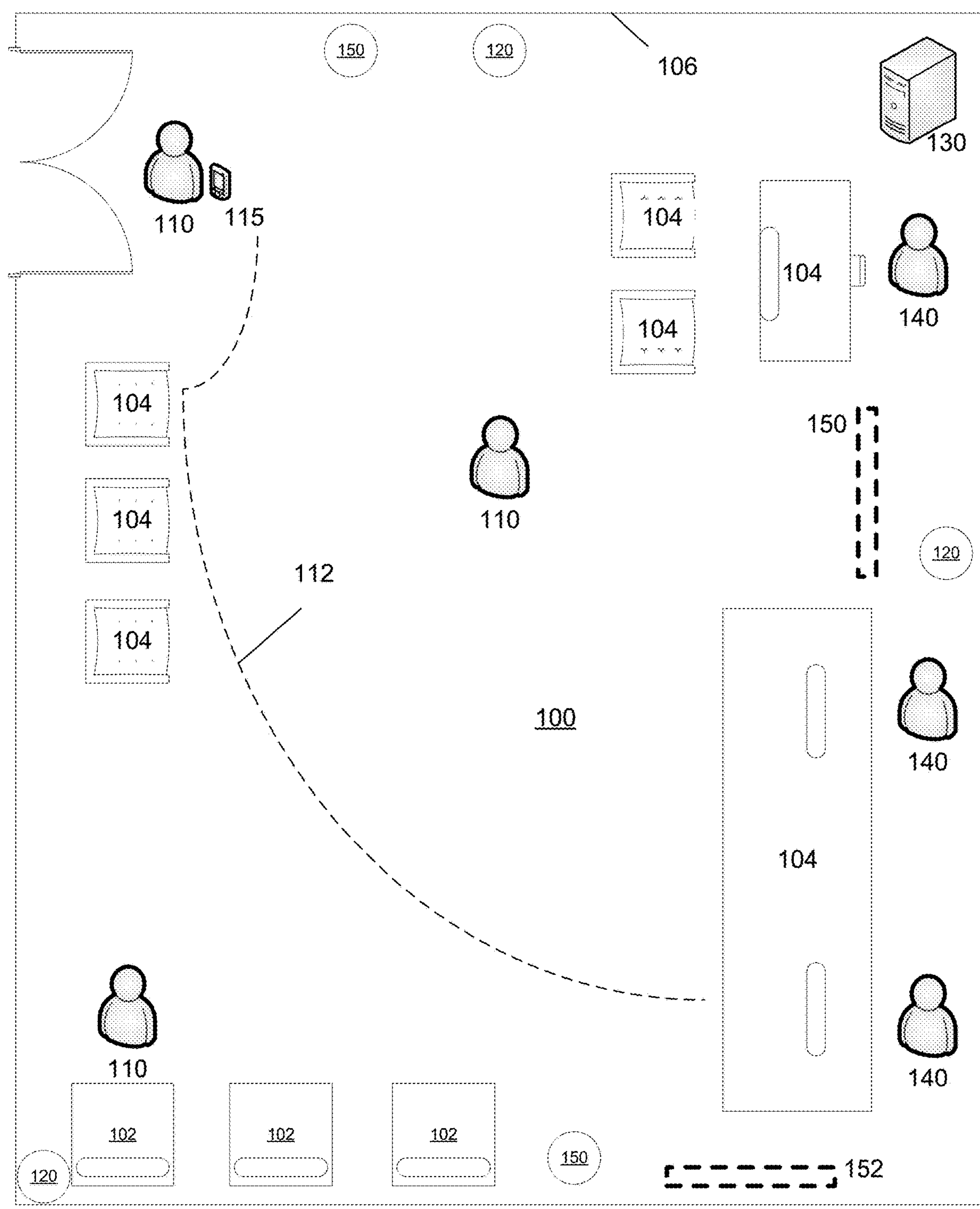
FIG. 1 is an exemplary system diagram for self-learning a location layout, according to an embodiment of the present invention.

FIG. 1 is an exemplary system diagram for self-learning a location layout, according to an embodiment of the present invention. FIG. 1 illustrates an exemplary space, such as a branch location. An embodiment of the present invention may be applied to locations and areas in various application, scenarios and use cases.

Area 100 may include equipment 102, furniture 104, walls 106, etc. Other elements may be included in area 100 as is necessary and/or desired, the nature of which may vary based on the purpose of physical location, the type of business, service provided, etc. In one embodiment, a plurality of individuals, such as employees 140, customers 110, etc. may be present in area 100.

Area 100 may be monitored by one or more image capture devices 120, such as a camera. Image capture device(s) 120 may be in communication with backend 130 that may receive and process image data from image capture device(s) 120. Image capture device(s) may be any suitable cameras, including charge-coupled device (CCD) cameras. For example, cameras 120 may detect the visible spectrum, the IR spectrum, thermal gradients, etc. Image capture device(s) 120 may capture individual images, videos, etc. According to an embodiment of the present invention, image capture device(s) 120 may perform image processing, object identification, etc. on the captured images. Backend 130 may represent a server, computer processor, computer system and/or other processing device that may be located locally or remotely. Backend 130 may represent a single system or a distributed system. Various architectures and implementations may be realized.

According to an embodiment of the present invention, backend 130 may process images and/or video received from image capture device(s) 120. For example, backend 130 may process the images/video to identify individuals, objects, equipment, furniture, etc. within the images/video. According to an embodiment of the present invention, backend 130 may associate each individual 110 or 140, object 115, equipment 102, furniture 104, etc. with a vector indicating a direction of facing/movement and a velocity of movement (if appropriate). Other directional data or movement data may be captured.

According to an embodiment of the present invention, individuals 110 and 140 may be present in area 100. Each individual 110 and 140 may have one or more features and/or attributes, such as size (e.g., height and weight), gait, posture, etc. that may be used to identify and/or determine movement of the individual 110 and 140 within the area.

According to an embodiment of the present invention, a mobile entity may move around and interact in area 100. The mobile entity may represent a robot, smart device and/or other automated entity. In this example, one or more cameras may identify and determine vector data associated with the mobile entity. The mobile entity may be known to the system and therefore easily and readily identified.

For example, individual(s) 110 may be associated with one or more objects 115. Examples of object 115 may include a mobile device, such as a smart phone, tablet, wearable, etc. as well as other electronic device. The object may belong to the individual or may be provided at the area (e.g., scanner, tablet, etc.). Area 100 may include one or more beacons 150 that may communicate with object 115 associated with individual 110 or 140. The beacon may be used to communicate with object 115 to interact with individual 110 or 140.

For example, individual 110 may represent a customer who entered area 100. While in area 100, individual 110 may be identified. This may occur through facial recognition, by presenting identification to an agent, by a beacon, by conducting a transaction, by thermal signature, etc.

An embodiment of the present invention may capture one or more actions made by an individual, such as individual 110. For example, in a banking environment, the system may capture an individual using equipment 102, such as ATM, sitting on furniture 104, etc. This action may be associated with the individual 110. An embodiment of the present invention may then generate a vector for equipment 102 based on an orientation of equipment 102. Other actions may include an individual walking towards a chair, sitting on the chair and then walking away from the chair. Each action (or a collective set of actions) and corresponding vector (or vector set) may be associated with the individual. According to an embodiment of the present invention, the vector may be associated with an individual, a stationary object or a combination of both.

An embodiment of the present invention may first recognize objects 102 or 104, such as electronic devices, furniture, etc. One or more elements may then be associated with the objects 102 or 104 to determine an orientation of the primary object 102 or 104. For example, in a bank branch environment, there may be multiple screens and keypads. By recognizing an ATM, and then a screen and/or keyboard associated with that ATM, the orientation of the ATM may be determined. An embodiment of the present invention may apply an algorithm to determine and/or fine-tune the orientation of different devices and/or accessories as is necessary and/or desired.

According to an embodiment of the present invention, based on the identity of individual 110 or 140, targeted advertisements, messages, offers, information, etc. may be presented to individual 110 while individual 110 waits, when individual 110 uses the device, etc.

Similarly, individual 110 interacting with employee 140 may sit opposite a computer workstation. A vector may be created for the workstation based on the location of the screen, keyboard, etc. relative to each other, and the roles of individual 110 and employee 140 may be determined based on their respective positions relative to the workstation. The roles may then be associated with the individual 110 and employee 140. According to another embodiment, employees 140 may be recognized based on their status as employees. Other variations may be supported.

In another embodiment, a queue length for an ATM or other device 102 may be monitored, and the wait time or duration may be posted, shared and/or otherwise communicated. In addition, additional resources may be provided to address long queues. The monitored data may also be used by an embodiment of the present invention to schedule resources and/or predict customer flow and volume. For example, data from a location may be used to identify patterns and may be analyzed and further used to make changes in resource allocation (e.g., greater/fewer number of agents, equipment, etc.).

According to an embodiment of the present invention, the identification and/or objects may be provided to employees 140 to assist employees 140 in recognizing and servicing individuals 110. For example, employee 140 may be informed that his or her next appointment is sitting in the waiting area and carrying a black backpack. The object recognition and association with an entity features are detailed in co-pending U.S. Ser. No. 15/999,146, filed Aug. 17, 2018, which claims priority to U.S. Provisional Application 62/546,717, filed Aug. 17, 2017, the contents of which are incorporated by reference herein in their entirety.

An embodiment of the present invention may be directed to analyzing individual activity within a branch location to generate and/or update a floorplan layout. As an individual walks out of one frame captured by one camera and enters another frame captured by another camera, an embodiment of the present invention may calculate and/or determine camera positions and angles based off the captured frames. An embodiment of the present invention may consider an individual's velocity, direction, vector and/or path of travel to determine camera location and angle. For example, an embodiment of the present invention may recognize that an individual has a scale (e.g., height, gait, posture, stance, etc.) that may be consistent (or at least correlated) throughout multiple frames. This information taken through one or more frames at one or more different angels and devices may then be used to determine camera location, position, etc. In addition, an embodiment of the present invention may identify stationary objects with known attributes, measurements, positions, size, etc. in connection with an individual's path of travel or other interaction. Camera location may include height, position, angle, field of view, relative distance to another camera and/or other object, etc. Information collected from individual cameras and/or other devices may be stitched together (or otherwise combined) to generate an overall floorplan of the branch location. An embodiment of the present invention may also be used to generate a portion of a floorplan as well as update an existing floorplan.

As shown in FIG. 1, an embodiment of the present invention may capture individual 110 as the individual travels first to seat 104 and then to teller 140, as represented by path 112. As the individual interacts with area 100, one or more cameras may capture the individual's movement. The frames may be analyzed relative to known objects with known attributes to accurately and systematically generate a floor plan representative of the branch location. The measurements may be taken at various frequencies and intervals to generate floorplan data.

An embodiment of the present invention may perform data analytics to determine foot traffic, congestion, peak hours, types of activity, effectiveness of marketing material and placement. For example, an embodiment of the present invention may suggest optimal marketing placement based on analyzed traffic patterns and usage data. In this example, an embodiment of the present invention may suggest advertisement placement at 152. In another example, an embodiment of the present invention may seek to determine effectiveness of an advertisement placed at 150. This may be determined by whether individuals stop to interact with advertisement 150. Other metrics and activities may be captured and analyzed. In this example, an embodiment of the present invention may recognize that more individuals interact with advertisement 152 compared to 150 and further confirm that advertisements nearest to tellers receive the better exposure.

An embodiment of the present invention may seek to determine a floorplan's effectiveness based on foot traffic, customer interactions and/or purchases, etc. An embodiment of the present invention may identify low performing locations and provide suggestions to improve foot traffic as well as customer engagement.

While the exemplary application involves a branch location of a financial institution, the various features of the invention may be applied to other locations, including a retail store location, restaurants, malls, a hotel lobby, an office building, a common/public area, parking garage, and/or other predefined or predetermined location of varying scale and scope.

Figure 2:
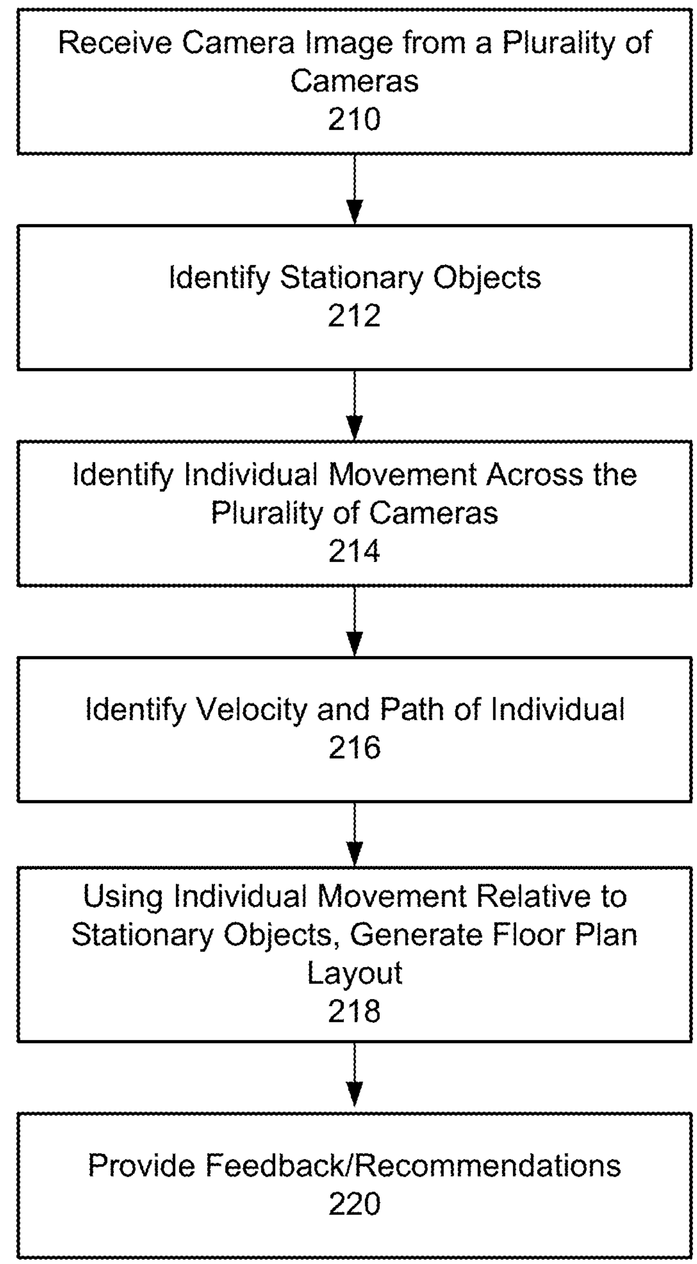
FIG. 2 is an exemplary flowchart for implementing a process for self-learning a location layout, according to an embodiment of the present invention.

FIG. 2 is an exemplary flowchart for implementing a process for self-learning a location layout, according to an embodiment of the present invention. At step 210, data may be received from a plurality of cameras positioned throughout a location. At step 212, one or more stationary objects may be identified for reference. At step 214, an individual may move about and interact with the location. At step 216, the individual's velocity and path may be captured. At step 218, using the individual's movement relative to the stationary objects, an embodiment of the present invention may generate a floor plan layout. At step 220, feedback, recommendations and/or other content information may be provided. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

At step 210, data may be received from a plurality of cameras positioned throughout a location. Data may include images (in various formats), video and/or other forms of data.

At step 212, one or more stationary objects may be identified for reference. This may include furniture, wall placement, doors, barrier/partition placement, devices, fixtures, cashiers, tellers, etc. Stationary objects may include other objects that do not move frequently within the location. Other types of objects associated with the location may be identified.

At step 214, an individual may move about and interact with the location. The individual may include a customer or potential customer who enters the location. The individual may also include an employee, e.g., teller, cashier, representative, etc.

For example, an individual may move within the range of a camera, and the camera may capture one or more image, video, etc. of the individual. In one embodiment, the camera may provide the image(s) or video to a backend system for processing. In another embodiment, the camera may process the images.

According to an embodiment of the present invention, the camera and/or backend may detect one or more physical characteristics of the individual. For example, the individual's facial features, size (e.g., height and weight), hair color, skin color, outfit and/or other characteristic may be used to uniquely identify the individual. An embodiment of the present invention may capture movement from a plurality of individuals that enter and interact with an area.

An embodiment of the present invention may also capture actions performed by the individual within the location.

Actions may include interaction with systems associated with the location. This may include interaction with various devices including ATMs, self-checkout machines, kiosks, electronic screens or billboards, etc. An embodiment of the present invention may also detect when an individual stops to read or notice a message or other communication presented at the location. This may include advertisements and informational messages.

In addition, while the individual is at the location, an embodiment of the present invention may interact with the individual through a mobile device. This may include presenting messages, texts and/or other real-time communications. For example, when the individual enters the location, an embodiment of the present invention may send a text messaging welcoming the individual to the location. This may occur when the individual is a registered or otherwise known customer. Other customized messages may be sent to the individual.

At step 216, the individual's velocity and path may be captured. According to an embodiment of the present invention, a vector may be associated with the individual. For example, as the individual moves within a location, the direction and/or speed of the individual may be used to predict the next camera with which the user will be detected.

At step 218, using the individual's movement relative to one or more stationary objects, an embodiment of the present invention may generate a floor plan layout. An embodiment of the present invention may also apply to updating an existing floor plan layout as well as providing recommendations and suggestions to achieve an identified goal (e.g., increased foot traffic, improved traffic flow, effectiveness of marketing placement, etc.) and/or optimal placement.

At step 220, feedback, recommendations and/or other content information may be provided. This may include marketing placement, advertisement as well as suggestions to improve a location's layout. In addition, feedback may be analyzed by a machine learning system to better understand customer interaction, flow data, etc.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, objective C, Swift, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for self-learning a floorplan layout, the method comprising the steps of:
   in an information processing apparatus comprising at least one computer processor:
   receiving, from a first video camera located at a facility, a first video stream;
   receiving, from a second video camera located at the facility, a second video stream;
   identifying one or more stationary objects located at the facility;
   recognizing, in the first video stream, a mobile entity;
   recognizing the mobile entity as it moves from the first video stream into the second video stream;
   determining vector data associated with the mobile entity based on the mobile entity in the first video stream and the second video stream;
   recognizing the one or more stationary objects relative to the mobile entity; and
   responsive to the vector data and the mobile entity's movement relative to the one or more stationary objects, automatically generating floor layout data identifying placement of the one or more stationary objects located at the facility.

2. The method of claim 1, wherein the first image comprises a first plurality of images or a first video.

3. The method of claim 1, the second image comprises a second plurality of images or a second video.

4. The method of claim 1, wherein the mobile entity is an individual at the facility.

5. The method of claim 1, wherein the one or more stationary objects comprise one or more of: automated teller machine (ATM), self-checkout system, automated kiosk and camera system.

6. The method of claim 1, further comprising the step of:
   receiving, from a third image capture device located at the facility, a third image.

7. The method of claim 1, wherein the set of known attributes comprise one or more of: size and location.

8. The method of claim 1, wherein the vector data comprises a velocity and a direction.

9. The method of claim 1, further comprising the step of:
   identifying and capturing one or more user interactions with at least one of the one or more stationary objects.

10. The method of claim 1, wherein automatically generating floor layout data further comprises updating an existing floor layout.

11. A system for self-learning a floorplan layout, the system:
   a first video camera located at a facility;
   a second video camera located at the facility; and
   an information processing apparatus comprising at least one computer processor, where the at least one computer processor is configured to perform the steps of:
   receiving, from the first video camera located at the facility, a first video stream;
   receiving, from the second video camera located at the facility, a second video stream;
   identifying one or more stationary objects located at the facility;
   recognizing, in the first video stream, a mobile entity;
   recognizing the mobile entity as it moves from the first video stream into the second video stream;
   determining vector data associated with the mobile entity based on the mobile entity in the first video stream and the second video stream;
   recognizing the one or more stationary objects relative to the mobile entity; and
   responsive to the vector data and the mobile entity's movement relative to the one or more stationary objects, automatically generating floor layout data identifying placement of the one or more stationary objects located at the facility.

12. The system of claim 11, wherein the first image comprises a first plurality of images or a first video.

13. The system of claim 11, the second image comprises a second plurality of images or a second video.

14. The system of claim 11, wherein the mobile entity is an individual at the facility.

15. The system of claim 11, wherein the one or more stationary objects comprise one or more of: automated teller machine (ATM), self-checkout system, automated kiosk and camera system.

16. The system of claim 11, further comprising the step of:
   receiving, from a third image capture device located at the facility, a third image.

17. The system of claim 11, wherein the set of known attributes comprise one or more of: size and location.

18. The system of claim 11, wherein the vector data comprises a velocity and a direction.

19. The system of claim 11, further comprising the step of:
   identifying and capturing one or more user interactions with at least one of the one or more stationary objects.

20. The system of claim 11, wherein automatically generating floor layout data further comprises updating an existing floor layout.

* * * * *